INVENTORS.
JAMES A. FINNERAN, HAYS C. MAYO,
ROBERT H. MULTHAUP & RONALD B. SMITH
ATTORNEY
AGENT

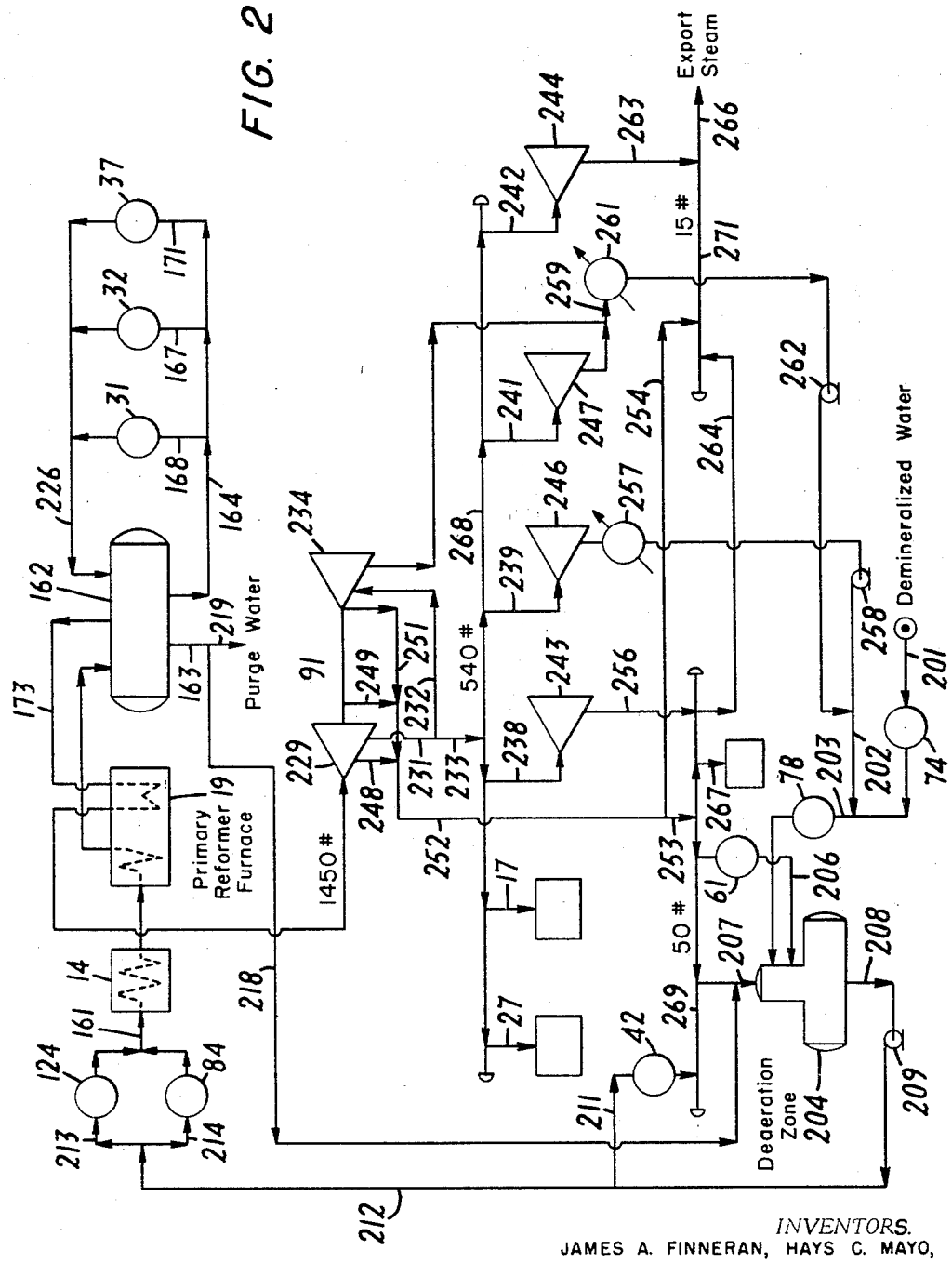

United States Patent Office 3,441,393
Patented Apr. 29, 1969

3,441,393
PROCESS FOR THE PRODUCTION OF
HYDROGEN-RICH GAS
James A. Finneran, Garden City, and Hays C. Mayo, Huntington, N.Y., Robert H. Multhaup, London, England, and Ronald B. Smith, Old Greenwich, Conn., assignors to Pullman Incorporated, Chicago, Ill., a corporation of Delaware
Filed Jan. 19, 1966, Ser. No. 521,697
Int. Cl. C01b 2/08, 2/14
U.S. Cl. 48—197                    27 Claims

ABSTRACT OF THE DISCLOSURE

In a process for the production of hydrogen-rich gas at elevated pressure, particularly ammonia synthesis gas, by any one or a combination of steps comprised of partial oxidation, primary reforming, secondary reforming and shift conversion, at elevated temperatures and intermediate pressures followed by compression of the hydrogen-rich gas to an elevated pressure, the improvement of producing steam at pressures substantially higher than said intermediate process pressure by indirect heat exchange between water and hydrogen-rich gas at the intermediate pressure, expanding the high pressure steam to a pressure at least that of the process pressure, utilizing the energy derived from the expansion for gas compression within the process, and utilizing at least a portion of the expanded steam as process steam. Further expansion of portions of the expanded steam provides additional energy for gas compression and liquid pumping within the overall process.

---

Figure 1:
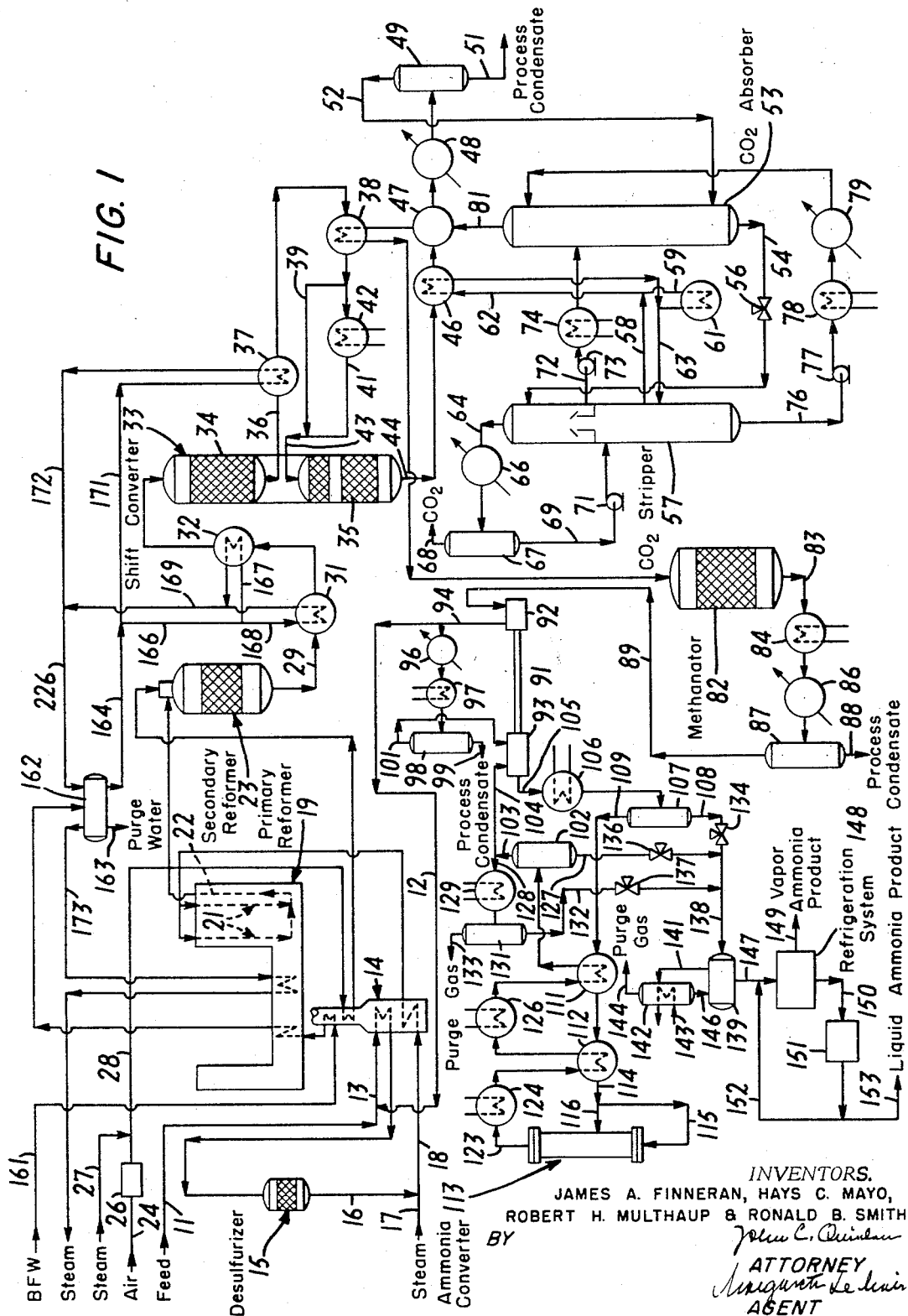

The present invention relates to an improved method for the recovery and utilization of thermal energy in a process for the production of a hydrogen-rich gas to be delivered at elevated pressures. In one aspect the invention relates to an improved method for the recovery and utilization of energy in a process for the production of ammonia synthesis gas. In another aspect the invention relates to an improved ammonia process.

It is well known that hydrogen-rich gases can be produced by reacting a hydrocarbon with steam, air or oxygen or a combination of steam and air or oxygen in the presence or absence of catalyst under conditions of temperature and pressure that favor the production of hydrogen. The reaction equations with methane are typical examples of these reactions:

$$CH_4 + H_2O = 3H_2 + CO$$

$$2CH_4 + O_2 = 4H_2 + 2CO$$

These reactions are called respectively "reforming" and "partial oxidation" or "partial combustion." In commercial practice, both reactions are usually involved, although one of the two is usually selected to be dominant and thus gives its name to the process. This invention applies to any and all of these methods for the production of hydrogen-rich gas including hydrogen-containing synthesis gas, with the terms having the following meanings:

(1) "Partial oxidation" is a reaction where hydrocarbons are contacted with commercially pure oxygen and usually some steam in the absence of a catalyst under conditions which favor the production of hydrogen-rich gas, (2) "Primary reforming" is a reaction where hydrocarbons are contacted with steam in the presence of a catalyst under conditions which favor the production of hydrogen-rich gas, and (3) "Secondary reforming" is a reaction where hydrocarbons are contacted with steam and oxygen (in commercially pure form, as air, or as oxygen-enriched air) in the presence of a catalyst under suitable conditions for the production of hydrogen-rich gas.

Partial oxidation is conducted by reacting hydrocarbons, which can be either liquid or gaseous at normal temperatures and pressures, with commercially pure oxygen and steam in the absence of a catalyst at elevated temperatures and usually at elevated pressures. Where elevated pressures are used, compression of the oxygen and of the feed hydrocarbons where the latter are normally gaseous is necessary prior to their introduction to the partial combustion zone.

Primary reforming is conducted by contacting hydrocarbons, which can be either liquid or gaseous at normal pressures and temperature, with steam over a catalyst at elevated pressures and temperatures. In the case where gaseous hydrocarbons are used as feed, it is necessary to compress the gas prior to its introduction to the primary reforming zone. The endothermic heat of reaction is supplied by combustion of fuel in a tubular furnace and by the energy of the added steam.

Secondary reforming is conducted by contacting a hydrocarbon feed, usually a gaseous feed, which can be the effluent from a primary reforming zone containing methane, with oxygen, usually as air, and steam in the presence of a catalyst in an adiabatic zone maintained at elevated temperatures and pressures, which necessitates the compression of air or oxygen prior to its introduction to the secondary reforming zone and also the compression of the gaseous hydrocarbon feed in the cases where secondary reforming is not preceded by primary reforming. It may not be necessary to add steam to the secondary reforming zone when the feed to said zone is the product stream from a primary reforming zone and said product stream contains sufficient steam for the reaction in the secondary reforming zone.

In addition to hydrogen, the chemical reactions according to any of the above defined processes produce carbon monoxide. In those cases where carbon monoxide is not desired in the final product gas of the process, the effluent from the reaction zone, be it a reforming or partial oxidation zone, can be introduced into a shift conversion zone, where the carbon monoxide present in the effluent is reacted with steam in the presence of a catalyst to form carbon dioxide and additional hydrogen, by the water gas shift reaction:

$$CO + H_2O = CO_2 + H_2$$

Depending upon the subsequent use, the raw hydrogen-containing gas can be subjected to a number of varied purification steps. For instance, if the gas is desired substantially free of $CO_2$ as is the case with ammonia synthesis gas, the raw gas is contacted with a circulating regenerable $CO_2$ absorbent. The small remaining portions of $CO_2$ and CO can then be removed by any method known in the art, e.g., methanation in which the carbon oxides react with hydrogen in the gas in the presence of catalyst to form methane. The latter is inert in the synthesis reaction and can be allowed to remain in the gas.

Hydrogen and hydrogen-rich gases at high pressure are necessary in many important commercial processes, e.g., mixtures of hydrogen and carbon monoxide are employed in the synthesis of hydrocarbons and of oxygenated hydrocarbons such as alcohols and ketones. Many known petroleum refining processes require hydrogen at high pressures. A most important usage for hydrogen-rich gas is in ammonia synthesis, where pressures up to 20,000 p.s.i.g. are employed. The elevated pressure employed in such processes are generally much higher than the intermediate pressures feasible for the generation of the hydrogen-rich gas, necessitating substantial compression thereof. This compression requirement involves consumption of large amounts of energy, frequently being the point in the overall process requiring the greatest single input of energy. Supply of such energy in an efficient way thus is a key factor in the economic attractiveness of the entire process.

Existing commercial processes for producing hydrogen or hydrogen-rich gas have provisions for the recovery of waste energy. For instance, hot flue gases from the primary reforming furnace are used to generate steam at pressures approximately corresponding to the inlet pressure of the primary reforming zone so that it can be used therein. However, the steam generated from waste-heat in the primary reforming furnace is often inadequate to meet the large requirements of the process.

Where hydrogen-rich gas is produced by a combination of primary and secondary reforming, heat recovered from the hot effluent from the secondary reforming zone is used to generate steam at pressures corresponding to the inlet pressure of the primary reforming zone. With this heat recovery step and with the waste-heat recovery in the primary reforming furnace, sufficient steam is generated to satisfy the primary reforming steam requirement and any excess of steam may be used for other purposes within the plant.

In some processes additional heat recovery steps are takn to reduce the net energy requirements. For example, it is known to recover heat from the effluent of the shift conversion zone to provide some part of the heat required to regenerate the rich circulating absorbent used for $CO_2$ removal. In the case where the production of hydrogen-rich gas is part of an ammonia synthesis process, the effluent from the ammonia conversion zone is used for steam generation. However, since the effluent temperature is relatively low, the pressure at which substantial quantities of steam can be generated is severely limited, usually to about 100 p.s.i.g. While these expedients produce some improvement in efficiency, further and more substantial improvement in efficiency would be desirable.

It is therefore an object of the invention to provide an improved method of recovering and utilizing thermal energy in a process for the production of hydrogen or a hydrogen-rich gas.

Another object is to provide a method of recovering thermal energy at higher heat levels than heretofore practiced.

Still another object is to provide a method of producing sufficient energy from heat recovery in a process for the production of ammonia to supply substantially all of the gas compression power requirements of the process.

Another object is to provide an improved process for the production of ammonia.

Various other objects and advantages of the invention will be apparent to those skilled in the art from the following detailed discussion and description, the appended claims, and the accompanying drawings in which:

FIGURE 1 is a flow sheet illustrating one preferred form of a process for the production of ammonia incorporating one preferred embodiment of the improvements of the invention, and FIGURE 2 is a flow sheet showing the steam system integrated with the flow sheet of FIGURE 1.

The above objects are accomplished in accordance with the invention and in a process for the production of hydrogen-rich gas at an elevated pressure comprising reacting at an intermediate pressure and an elevated temperature a carbonaceous material taken from the group consisting of carbon monoxide, hydrocarbons and mixtures thereof, with an oxidizing gas taken from the group consisting of steam, oxygen and mixtures thereof to produce hydrogen-rich gas at substantially the intermediate pressure and compressing the hydrogen-rich gas to the elevated pressure, by a combination of steps comprising generating steam at a pressure substantially greater than the intermediate pressure, expanding steam thus generated and using resulting expansion energy to provide at least part of the energy required for gas compression in the process, as, for example, at least part of the energy required to compress the hydrogen-rich gas to the elevated pressure.

The generation of steam may be accomplished by indirect heat exchange of water with any high-level heat source, such as flue gas from the primary reformer or other radiant heat in the primary reformer or radiant heat in a separately fired radiant zone. However, it has been found to be particularly advantageous to generate the steam by indirect heat exchange between water and the hydrogen-rich gas at substantially the intermediate pressure.

Great additional benefit is obtained if the extent of expansion of the high pressure steam is to approximately the intermediate pressure of the hydrogen-rich gas generation step or steps and part of this partially expanded steam is passed to the process to provide at least part of the oxidizing gas for reaction with additional carbonaceous material. In this case, greatest benefit is obtained if the pressure at which the steam is generated is at least twice as great as the pressure of the hydrogen-rich gas generation step or steps.

The energy released by the expansion of the high pressure steam is thus recovered and used to provide energy required for compression. One of the most important and novel features of the invention is that it provides a method whereby thermal energy is converted to mechanical energy at high efficiency. The second law of thermodynamics involves the principle that the efficiency of conversion of thermal energy to mechanical energy is limited by a mathematical relationship involving the temperature at which energy is available and the temperature of the "sink." This efficiency of conversion, or "thermal efficiency," is generally 30–38% in practical systems for generation of mechanical power.

By raising the pressure of steam generation to a level substantially greater than that of the process, and by using steam from the partial expansion to the process level to supply the requirements of the process, we have found a method whereby thermal energy is, in effect, converted to mechanical energy at a thermal efficiency of 100%. This remarkable efficiency applies, of course, only to that portion of the steam which is used by the process. For that steam, the "sink" temperature is that temperature at which steam is used by the process. This "sink" temperature, however, is at a relatively high level, and one at which the energy of the steam is useful and indeed necessary for the successful operation of the process. For example, in the prior art, steam for the process has geen generated in boilers at approximately the same temperature and pressure as that of the partially expanded steam in our process. Therefore, considering only that steam to be used by the process, the incremental thermal energy to generate said steam at the temperature and pressures involved herein, compared to the temperature and pressure of expanded steam, is converted to mechanical energy at a thermal efficiency of 100%. For the example to be described hereinafter, about 200,000 lb. per hour of steam is used for the process. This steam, in expanding from about 1450 p.s.i.g. and about 825° F. to about 540 p.s.i.g. and about 600° F., generates approximately 6000 HP of mechanical energy. This energy, representing approximately ⅙ of the total compression energy of the entire ammonia plant, is generated at a thermal efficiency of 100%.

The amount of high-pressure steam which can be generated by recovery of process heat from the hydrogen-rich gas can, and frequently will, exceed the amount of steam required as reactant in the process. Various aspects of the invention are concerned with further utilization of this steam in providing energy requirements of the process other than that met by the partial expansion of high-pressure steam to the intermediate pressure of the gas generation step or steps and thus contributing to an overall thermal efficiency substantially exceeding the 30–38% levels of prior processes. For example, regardless of the particular process used to generate the hydrogen-rich gas at intermediate pressure, partially expanded steam not passed to the process proper can be further expanded and the energy thereby produced used to provide another part or all of the energy required to compress the hydrogen-rich gas to the elevated pressure and/or to provide energy to pump the feed water to the pressure required for the high-pressure steam generation.

In one embodiment of the invention, hydrogen-rich gas at an elevated pressure is produced by primary reforming at an intermediate pressure followed by compression, i.e., by contacting at an intermediate pressure and an elevated temperature hydrocarbons and steam in the presence of reforming catalyst, followed by compression of the generated hydrogen-rich gas to the elevated pressure at which it is used. High pressure steam is generated, preferably at a pressure ratio of at least 2:1, by indirect heat exchange between water and the effluent from the primary reformer, the steam is expanded to approximately the intermediate pressure of the primary reforming zone to produce expansion energy for compressing the hydrogen-rich gas or for other gas compression needs of the process, and at least a portion of the partially expanded steam is fed to the primary reformer to provide at least part of the steam requirements for the reaction.

In another embodiment of the invention, hydrogen-rich gas is produced by secondary reforming of hydrocarbons with steam and oxygen as air or otherwise in the presence of a catalyst and at elevated temperatures and intermediate pressures. The secondary reformer effluent is heat exchanged with water to generate steam at a substantially higher pressure, preferably in a pressure ratio of at least 2:1. At least a portion of the steam is expanded to approximately the intermediate pressure of the secondary reforming zone to produce expansion energy for one or more of the gas compression needs of the process. At least a portion of the partially expanded steam is then fed to the secondary reformer to provide at least part of the steam requirements for the reaction therein. However, if the hydrocarbon feed to the secondary reforming zone is the effluent from a primary reforming zone, direct steam addition to the secondary reforming zone may be omitted provided partially expanded steam is fed to the primary reformer in amounts sufficient to satisfy the steam requirements of both primary and secondary reforming.

In a third embodiment of the invention in which hydrogen-rich gas at an elevated pressure is produced by partial oxidation at an intermediate pressure by noncatalytic reaction of hydrocarbons, oxygen and steam and the resulting gas is compressed to the elevated pressure at which it is used, high-pressure steam is generated, preferably at a pressure ratio of at least 2:1, by indirect heat exchange between water and the effluent from the partial oxidation reactor, the high-pressure steam is expanded to approximately the intermediate pressure of the partial oxidation zone to produce expansion energy for compressing the hydrogen-rich gas or for other compression needs of the process, and at least a portion of the partially expanded steam is fed to the partial oxidation zone to provide at least part of the steam requirements for the reaction.

In the cases where hydrogen is produced at an intermediate pressure by shift conversion with steam of a gas containing carbon monoxide, high-pressure steam can be produced by indirect heat exchange between water and effluent from the shift conversion zone. At least a portion of this steam is then expanded to approximately the intermediate pressure of the shift conversion zone to produce expansion energy for gas compression in the process. A portion of the expanded steam can then be fed to the shift conversion zone or to any prior reaction zones, such as reforming or partial oxidation zones, to provide at least part of the steam required for the reaction or reactions.

In the case where a hydrogen-rich gas is produced in a process sequence comprising primary reforming with steam of hydrocarbons in an externally heated reaction zone, secondary reforming with air or oxygen and steam of the primary reformer effluent and shift conversion of the secondary reformer effluent in the presence of steam, high-pressure steam can be generated by separately heat exchanging a first stream of water with the effluent from the secondary reforming zone, and a second stream of water with the effluent from the shift conversion zone. At least a portion of the high-pressure steam is expanded to approximately the intermediate pressure of the primary reforming zone to produce energy for gas compression and portions of partially expanded steam can be fed to any one of the above mentioned reaction zones requiring process steam.

The effluent stream from the shift conversion zone, being partially cooled due to the steam generation, can then be subjected to further shift conversion at relatively low temperature. In any case the shifted gas is further cooled by indirect heat exchange to condense unreacted steam contained therein. The uncondensed gas, containing carbon dioxide and minor amounts of unconverted carbon monoxide, is usually contacted with a regenerably $CO_2$ absorbent, such as water, monoethanolamine, hot potassium carbonate in an absorption zone maintained under conditions suitable for the absorption of carbon dioxide. The purified stream emanating from said absorption zone will then contain only minor amounts of oxides of carbon. The carbon dioxide-containing absorbent is heated by indirect heat exchange with warmer process streams to a temperature necessary for desorption of carbon dioxide in a regeneration zone and preferably at least part of the necessary heat is supplied by indirect heat exchange with low-pressure steam obtained as hereinafter described. The regenerated absorbent is cooled to the temperature of the absorption zone preferably by indirect heat exchange with boiler feed water to preheat said water and the absorbent is subsequently returned to said absorption zone to complete the cycle.

The effluent stream from the absorption zone can be purified further, if the subsequent usage of the hydrogen-rich gas so demands. For instance, even minor amounts of oxides of carbon present in ammonia synthesis gas will have a detrimental effect on the ammonia synthesis and are therefore removed by any of the methods known in the art, e.g., scrubbing with regenerable solutions of cuprous ammonium acetate, cuprous ammonium formate or a combination of the two, or scrubbing with nitrogen. A preferred method, however, is catalytic methanation at elevated temperatures, where the oxides of carbon react with hydrogen in the presence of catalyst to form methane and water. The effluent from the absorption zone may be heated to the temperature necessary for the methanation reaction by indirect heat exchange with shift converter effluents, thereby partially cooling said effluents to a temperature where unreacted steam contained therein will condense. Alternate methods of heating the methanator feed to the desired reactor inlet temperature include heat exchange with secondary reformer effluent or methanator effluent. The gases leaving the methanation zone are cooled with water, preferably with at least a portion of the boiler feed water, this step serving two purposes: it will condense the water in the gas, which if allowed to remain in the synthesis gas, would deactivate the ammonia synthesis catalyst and it will aid in bringing the boiler feed water to the temperature necessary for the high pressure steam generation.

Since high pressure favors the methanation reaction, the hydrogen-rich gas depleted in $CO_2$ can be compressed from the intermediate pressure at which it is generated to the elevated pressure at which it is to be used prior to the methanation step rather than following it.

As indicated, the expansion of high-pressure steam generated by recovery of process heat is used to provide energy for gas compression in the process. There are a number of gas compression services involved depending upon the particular process used for generation of hydrogen-rich gas at intermediate pressure and for use of such gas at elevated pressure. In any of these processes, the hydrogen-rich gas is compressed from the intermediate to the elevated pressure and energy requirements thereof can always be supplied, if desired, by expansion of the high-pressure steam. In addition to that compression service, other services include feed hydrocarbon gas compression, air or oxygen compression and refrigerant compression where refrigeration is required in connection with the process. The energy developed by expansion of high-pressure steam can be used in accordance with the invention in any one or more of these services. Also as indicated, it is desirable to further expand that part of the partially expanded steam not used directly as reactant at intermediate pressure in the process. The energy developed by such further expansion is used to fill remaining gas compression needs and liquid pumping needs, such that, so far and as efficiently as possible, energy recovered from the process is utilized to supply energy requirements of the process. It will be appreciated that the invention is not limited to any particular pressure levels, there being clear advantage in terms of efficiency regardless of the particular pressure levels used and selected. By way of illustration, however, it will be noted that the intermediate pressures at which hydrogen-rich gas is generated in present commercial processes are in the range of about 300 to about 600 p.s.i.g. The elevated pressure to which the hydrogen-rich gas is compressed is greater and is generally in the range of about 1000 to about 5000 p.s.i.g. The high-pressure steam is generated at a pressure substantially greater than the intermediate pressure, preferably at least twice as great, and is in the range of about 800 to about 1800 p.s.i.g. Where high-pressure steam is partially expanded to approximately the intermediate pressure and part or all of the partially expanded steam is then fed into the process as a reactant, it will be appreciated that the specific pressure to which the high-pressure steam is expanded will be selected such that the steam has sufficient pressure to overcome ordinary pressure drop in the steam system and to meet the process pressure prevailing at the particular point in the process where the steam is injected. In this regard, it will be understood that a gas generation system involving a plurality of steps operates at no one specific intermediate pressure, there being a pressure drop through the process, such that, for example, the pressure at the inlet to a primary reformer might be 500 p.s.i.g. while that at the outlet of a methanator in the same process system might be 400 p.s.i.g., the whole process system, however, being regarded as operating at an intermediate pressure.

The further expansion of partially expanded steam is carried out to pressure levels ranging from below atmospheric pressure up to about 100 p.s.i.g., i.e., the secondary expansion zones can be either of the condensing or the noncondensing type, depending upon the overall process requirements for low pressure steam. Where, for instance the secondary expansion zone is a condensing turbine, the exhaust condensate can be returned to the steam cycle as boiler feed water. The exhaust steam from a noncondensing expansion zone can be used for various further duties both within and outside of the process, e.g., it can be used to heat various process streams by indirect heat exchange. Other miscellaneous requirements for low pressure steam where secondary expansion zone exhaust steam can be utilized are for ejectors, atomizers or for export outside the process.

The water used for the steam generation can be obtained from any convenient source and can include recycle water such as exhaust condensate from secondary expansion zones, water condensate resulting from cooling and separation of the effluent from the shift conversion zone and water in the form of low pressure steam. The necessary make-up water stream is usually purified to avoid fouling and corrosion-erosion in the steam-generation zones. Since the fresh water purity requirements are a function of a steam generation pressure and of the rate at which water is purged from the steam generation zones, some variations in the required purity are to be expected, however, generally the feed water is purified to contain less than about 1 part per million of totally dissolved solids and less than about 0.1 part per million preferably less than about 0.02 part per million of silicon dioxide.

The purified feed water is admixed with the process recycle water and contacted with low pressure steam in a deaeration zone maintained at a low pressure, preferably at about atmospheric pressure to about 50 p.s.i.g. and at a temperature of about the boiling temperature of water at those pressures. The deaerated water is subsequently pressurized to a pressure somewhat above the steam generation pressure.

Advantage is taken whenever possible of heat available in the process to preheat the boiler feed water prior to the steam generation. For instance, indirect heat exchange with regenerated absorbent can be used to achieve the desired temperature of the water in the deaeration zone. Also, at least a portion of the water can be preheated by indirect heat exchange with the methanator effluent to cool said effluent. Additional preheat is desirable prior to the steam generation. This can be achieved in those cases where primary reforming is included in the process system, by indirect heat exchange with the hot flue gases from the burning of fuel in the primary reformer furnace.

Some vaporization may take place during the final preheating. The liquid water is separated from the steam in a separation zone or steam drum. High-pressure water from this drum is then passed in indirect heat exchange with hot gases such as hot hydrogen-rich gas, as aforesaid, at least partially vaporizing the water. The high-pressure steam thus generated is then used following separation of unvaporized water, this separation being carried out preferably in the same separation zone or steam drum. A portion of the separated water can be purged from the system so as to maintain total dissolved solids less than about 100 p.p.m., preferably less than about 50 p.p.m. in the water.

The high-pressure saturated steam leaving the separation zone is desirably superheated, preferably to a temperature ranging from about 750° F. to about 950° F., more preferably from about 750° F. to 850° F. This can be done by indirect heat exchange of the saturated steam with hot effluent streams from one or more of the hydrogen producing reaction zones prior to using said hot streams for the generation of saturated steam.

In the embodiments of the invention where primary reforming is included, the superheating is preferably carried out by indirect heat exchange with hot flu gas in the primary reformer furnace.

A wide variety of hydrocarbon feeds can be employed for the production of hydrogen gas ranging from normally gaseous materials to solid carbonaceous material. Gaseous materials, such as hydrogen-rich refinery gas, coke-oven gas, natural gas, petro-chemical and cracked refinery gases and liquid petroleum gases are all suitable as feed materials. Liquid feeds, such as naphthas boiling in the gasoline region are also suitable. Heavier feeds such as crude oil, residual oils or solid carbonaceous material can also be used if the partial oxidation method is used.

The feed materials often need pretreatment to eliminate or decrease the concentration of undesirable components, which if not removed might have a deleterious effect on the process or on the subsequent process where the hydrogen-rich gas is to be employed. For instance, many of the above feeds contain sulfur, which is a reforming catalyst poison. Any of the many known desulfurization methods are then used in such case.

Although the invention is applicable to any of the above disclosed methods for production of hydrogen-rich gas, it is particularly advantageous when integrated into a process for the production of ammonia. In order to provide an illustration of one unified process sequence showing how the various aspects of the invention can be effectively incorporated therein, a particular process for the production of ammonia will be described. The ammonia process comprises the steps of primary reforming of hydrocarbons with steam, secondary reforming of the product gas from primary reforming with compressed air, shift conversion of the product gas from secondary reforming, removal of $CO_2$ from the product gas from shift conversion using a regenerable absorbent, methanation of the product gas from $CO_2$ removal, all of these steps being carried out at substantially an intermediate pressure, compression of the product gas from methanation to an elevated pressure, ammonia synthesis at the elevated pressure and ammonia recovery using a circulating refrigerant in a compression-expansion cycle to condense and recover the synthesized ammonia. In the context of this ammonia process, the invention comprises generating steam at a pressure substantially greater than the intermediate pressure by recovery of waste heat from the product gas from secondary reforming and that from shift conversion, partially expanding steam thus generated to approximately the intermediate pressure, using resulting expansion energy to provide at least part of the energy required for gas compression in the process, passing part of the partially expanded steam to the process to provide at least part of the process steam required in the reforming and shift conversion steps, further expanding another part of the partially expanded steam and using the energy thereby produced to provide at least part of the remaining energy requirements of the process for gas compression and liquid pumping. The gas compression requirements include those for the synthesis gas, air and refrigerant and can include feed hydrocarbon compression as well, while the liquid pumping requirements include those for the regenerable $CO_2$ absorbent and the feed water for steam generation.

The hydrocarbons supplied to the primary reforming zone can be any hydrocarbon or mixture of hydrocarbons which is capable of being vaporized or gasified and reacted under conditions existing in the primary and secondary reformers. Hydrocarbon feeds as light as natural gas and as heavy as a vaporized catalytic cycle oil with a molecular weight of about 250 can be successfully reformed. Substantially heavier hydrocarbons are only difficultly reformed because of the problems of satisfactorily vaporizing them. Specific examples of hydrocarbon feedstocks which can be used in the process include natural gas and light naphtha.

The hydrocarbon feed is vaporized if necessary, preheated and combined with a controlled amount of preheated steam. The admixture may be further heated to a temperature of about 900 to about 1000° F. The admixture is passed to the primary reforming zone in contact with suitable steam reforming catalyst, preferably disposed in a plurality of furnace tubes which are externally heated by the combustion of fuel to produce a hot flue gas to provide the endothermic heat of reforming and to produce an effluent temperature of about 1300° F. to about 1650° F., preferably about 1400°F. to about 1600° F. A backpressure above about 350 p.s.i.g. is maintained on the first reforming zone, preferably a backpressure of about 400 p.s.i.g. to about 750 p.s.i.g. is maintained. The high reforming pressure greatly reduces the power required in the subsequent compression of synthesis gas.

Heat is recovered from the hot flue gas in the primary reformer to preheat boiler feed water, superheat the high-pressure steam and preheat the reactants to the primary reformer. Forced and induced draft fans can be used in connection with the reforming furnace, the power for which can be supplied by expansion of steam.

Regardless of the molecular weight of the hydrocarbon feed to the primary reformer, the hydrocarbons remaining in the effluent therefrom are comprised essentially of methane. In order that the effluent contain between about 2 and about 15 mol percent methane on a dry gas basis, preferably about 5 to about 10 mol percent methane on the same basis, relatively high steam-carbon ratios are used to overcome the adverse effect of the high pressure on methane equilibrium concentration. At backpressures of about 350 to about 750 p.s.i.g., steam-carbon ratios of at least about 2.5, preferably about 3.5, are used. The terms "dry gas" and "steam-carbon ratio" are to be interpreted in the usually accepted manner, i.e., dry gas includes all components of the gas except steam, and steam-carbon ratio is the ratio of mols of steam to mols of organic carbon present in the feed.

The effluent of the primary reforming zone, containing hydrogen, carbon monoxide and the indicated proportion of methane, is passed with an oxygen-containing gas and steam into the secondary reformer containing a suitable reforming catalyst. The secondary reformer is maintained at substantially the same pressure as the primary reformer and at an outlet temperature between about 1600° F. and about 1900° F., preferably from about 1670° F. to about 1760° F. Air is preferably employed exclusively to provide the oxygen requirement of the secondary reforming zone because of its low cost and availability, but it should be understood that oxygen or oxygen-enriched air can be used. The quantity of air employed in the secondary reforming zone is influenced by the amount of nitrogen which is necessary for producing the feed gas for ammonia synthesis gas and is also influenced by the combustion heat required to provide the additional heat necessary to substantially complete the endothermic reforming reaction. Since it is desirable that the products of the secondary reforming zone contain less than about 2.0 mol percent methane on a dry basis, preferably less than about 1.0 mol percent methane on a dry basis, the quantity of oxygen supplied to the secondary reforming zone as air or otherwise is controlled to give a volume ratio of inlet air to inlet dry gas of about 0.2 to about 0.5, preferably about 0.3 to about 0.4. The amount of steam provided to the secondary reforming zone is controlled to give a volume ratio of water vapor to dry gas of about 0.4 to about 1.3, preferably about 0.6 to about 1.1. Normally the effluent of the primary reforming zone contains sufficient steam to satisfy the requirements of the secondary reforming zone, however, additional steam can be added if necessary.

Specific examples of reforming catalysts which can be used in the reforming zones are nickel, nickel oxide, cobalt oxide, chromia, molybdenum oxide, etc. Any one or more of these catalysts can be used in either of the reforming zones and the catalyst used in the second reforming zone need not be the same as that used in the first reforming zone.

The quantity of catalyst employed in each reforming zone and the rates at which reactants are passed over the catalyst are defined in terms of residence times calculated by dividing the depth of catalyst by the average superficial linear velocity of the total gas mixture. In general, in order to obtain the necessary conversion in the first reforming zone at the indicated conditions of operation the residence time of the feed materials in the catalyst bed is held between about 0.5 and about 10 seconds, preferably about 1.5 to about 5 seconds. In the secondary reforming zone, residence times above about 0.5, preferably about 1.0 to about 10 seconds, are suitable.

The effluent of the secondary reforming zone is cooled to a temperature of about 600° F. to about 800° F., the cooling carried out by indirect heat exchange with preheated pressurized boiler feed water to generate high pressure steam, and passed to a shift conversion zone in which conditions are controlled to promote the reaction of steam and carbon monoxide in the presence of a suitable shift catalyst to produce carbon dioxide and additional hydrogen. The relative quantities of the reactants in the shift conversion zone are generally from about 0.5 to about 1.5 volumes of steam per volume of dry gas. Normally the steam present in the secondary reformer effluent is adequate to supply the steam requirements for the shift conversion, but extraneous steam may also be added if necessary. The catalyst used for this reaction is known in the art as a "high temperature shift catalyst" and it can be essentially any polyvalent metal or oxide thereof. Usually, however, an oxide of a Group VIII metal having an atomic number not greater than 28 or an oxide of a metal of the left-hand elements of Group VI is used. The catalysts include, for example, iron oxide, nickel oxide, cobalt oxide, chromia, molybdena, tungsten oxide, etc. The quantity of water gas shift catalyst which is used is determined on the basis of the volumetric space velocity used, i.e., the volume of reactant materials (at 60° F. and 760 mm.) fed to the shift conversion zone on an hourly basis per unit volume of catalytic material which is present therein. Generally, sufficient catalyst is used to give a volumetric space velocity of about 500 to about 5000, preferably about 500 to about 2000, on the indicated basis.

Conditions maintained in the shift conversion zone include pressures substantially the same as those maintained in the first reforming zone, inlet temperatures of about 600 to 800° F., preferably about 650° F. to about 750° F., and outlet temperatures of about 700 to about 900° F., preferably about 750° F. to about 850° F.

Since the water gas shift reaction is exothermic, it is preferred to carry out the reaction in a series of catalyst beds. The temperature of the gas between the beds is adjusted by means of indirect heat exchange with colder streams or direct heat exchange by injecting water or steam. Since the rate of reaction is decreasing throughout the reaction zone, it is preferred to employ a relatively small amount of catalyst in the initial bed with progressively increasing amounts in succeeding beds. The cooling requirements will be determined by the reaction temperatures, the relative volumes of the catalyst beds and the quantity of carbon monoxide which is to be reacted.

High-pressure steam can be generated by indirect heat exchange of preheated pressurized boiler feed water with effluents from any one of the catalyst beds employed. In one embodiment of the invention two consecutive catalyst beds are separated by a steam generation zone, the heat of reaction being absorbed by the generation of steam and additional high pressure steam is then generated by heat exchange with the hot effluents from the last catalyst bed.

In a preferred application of the invention the catalyst of the second or final bed of the shift conversion zone is a low temperature shift catalyst. Such catalysts are well known and are commercially available. One such catalyst is described, for example, in U.S. 1,809,978 to Larson, issued June 16, 1931, consisting of copper, zinc and one or more of the elements selected from the group consisting of chromium, tungsten, silicone, vanadium and molybdenum, with all of these elements being present in either a free of chemically combined state. Conditions used are substantially the same as the conditions described previously for the high temperature shift conversion bed or beds with the exception of temperature. Since inlet temperatures of the low temperature shift conversion bed should be about 430° F. to about 530° F., it is necessary to cool the gas prior to this stage of shift conversion, and in the manner of this invention the cooling is done at least in part by indirect heat exchange with water to generate high-pressure steam. It is desirable to generate as much high-pressure steam as possible in this way. To the extent that the partially shifted gas is to be cooled to temperature levels below those at which high-pressure steam can be generated, such cooling can be done with the generation of relatively low-pressure steam.

The heat of reaction liberated in said last stage of shift conversion will result in outlet gas temperatures in the range of about 450° F. to about 550° F. The effluent from the shift conversion zone will contain varying amounts of steam, depending upon the mode of controlling the temperatures of the shift conversion zone. The steam is condensed by cooling of the effluent stream with a colder process stream as hereinafter described, and the condensed water is removed and is preferably returned to the steam cycle as part of the boiler feed water.

Carbon dioxide present in the effluent from the shift converter, be it single or multistage, is removed in any suitable manner although generally it is preferred to contact the effluent with a material having selective absorption power for carbon dioxide. Any of the well known absorbents mentioned earlier can be used, aqueous solutions of the alkanolamines such as monoethanolamine and diethanolamine being preferred examples. The rich absorbent solution can be readily regenerated for reuse by heating and depressuring. Where aqueous solutions of monoethanolamine are used for example in the process, conditions in the absorption zone include pressures substantially the same as that in the primary reforming zone and temperatures of about 80° F. to about 180° F. Conditions in the regeneration zone include pressures of about 0 p.s.i.g. to about 20 p.s.i.g. and temperatures of about 180° F. to about 250° F. The amount of absorbent necessary for removal of carbon dioxide ranges from about 0.21 to about 0.35 gallon per cubic foot of carbon dioxide and the heat required to bring the absorbent to the regeneration temperature amounts to between about 800 B.t.u./gallon and about 1200 B.t.u./gallon. Thus, large quantities of heat at relatively low temperature levels are necessary to supply the energy required to regenerate the absorbent. This may be achieved by indirect heat exchange with any available warmer stream. In a preferred embodiment, part of the heat requirement is supplied by indirect heat exchange with exhaust steam from a secondary expansion zone. The remaining heat can then be obtained by indirect heat exchange with effluent from the high temperature shift conversion zone after high-pressure steam generation and/or with the effluent from the low temperature shift conversion zone.

The power generated in a secondary expansion zone can be utilized advantageously for the repressuring of the regenerated absorbent to the pressure of the absorption zone.

After removal of carbon dioxide, the gas is passed to a methanation zone in which residual oxides of carbon are reacted with hydrogen contained in the gas in the presence of a suitable methanation catalyst to produce methane and steam. The methanation zone is maintained at a temperature between about 400° F. and about 800° F., preferably about 450° F. to about 700° F., and an intermediate pressure of the same order of magnitude as that in the primary reforming zone. The temperature of the gas is raised to the inlet temperature of the methanation zone by indirect heat exchange with a warmer process stream. A preferred method of the invention is to heat exchange the gas leaving the absorption zone in one or more heat exchange steps with the gases leaving one or more of the shift conversion catalyst beds, the heat exchange when carried out in multiple stages also serving to at least partially control the temperatures within the shift conversion zone. In the preferred case where a low temperature shift conversion catalyst is charged to the last catalyst bed, the feed gas to the methanation zone is heated in one or more heat exchange steps; e.g., first with the low temperature catalyst effluent which may already have been used to preheat the carbon dioxide rich absorbent to be fed to the regeneration zone and subsequently with the effluent from a preceding high temperature catalyst bed, which already has been used to generate high-pressure steam. The same catalysts listed above for the reforming reaction are suitable methanation catalysts. The amount of methanation catalyst and the rate of flow thereover are such as to give a volumetric space velocity, i.e., volume of gas measured at standard conditions per hour per volume of catalyst, of about 1000 to about 10,000. Under the indicated conditions, substantially all of the residual oxides of carbon are converted to methane to yield in the effluent from the methanation zone synthesis gas containing about three mols of hydrogen per mol of nitrogen, the preferred proportions for ammonia synthesis.

Synthesis gas is recovered from the methanation zone, cooled to condense out the water formed in the methanation reaction and compressed to the still more elevated pressure required by ammonia synthesis. The compressed synthesis gas is reacted in an ammonia conversion zone in the presence of a suitable catalyst under conditions favorable for production of ammonia, including temperatures ranging from about 700° F. and to about 950° F. and pressures ranging up to about 20,000 p.s.i.g.

The hot effluent from the ammonia conversion zone is cooled by indirect heat exchange with the feed gas to preheat said feed gas to reaction temperature, and can then advantageously be further cooled with boiler feed water, thereby supplying a large portion of the preheat necessary to bring said boiler feed water to the boiling point at the steam generation pressure.

The effluent is subsequently subjected to additional cooling steps by indirect heat exchange, said steps comprising heat exchange with the feed to the synthesis reactor to partially preheat said feed to the desired reactor inlet temperature and then, before or after recycling unreacted synthesis gas, heat exchange with flashing refrigerant to condense the product ammonia.

The power necessary to compress the flashed refrigerant is obtained by expansion of steam generated within the synthesis gas preparation section of the overall ammonia process.

Favorable results are obtained when applying the invention to any of the above described combinations of process steps for the production of ammonia, regardless of the specific pressures used in the process. The synthesis of ammonia can be carried out at pressures up to about 20,000 p.s.i.g. and is commonly carried out at pressures ranging from about 4000 p.s.i.g. to about 6000 p.s.i.g.

However, in the manner of this invention, it has been found particularly advantageous to carry out the synthesis of ammonia at pressures ranging from about 1500 p.s.i.g. to about 3500 p.s.i.g. and to prepare the synthesis gas in the preferred manner described above, i.e., primary reforming of a hydrocarbon feed with steam at pressures ranging from 350 p.s.i.g. to 750 p.s.i.g. followed by secondary reforming, shift conversion, carbon dioxide absorption and methanation, each of said process steps operated under the preferred conditions. Thus, the low pressure differential between the synthesis gas preparation section and the ammonia synthesis section of the process results in less total work required for compression than would be required when synthesizing ammonia at the more common pressures of about 4000 p.s.i.g. to about 6000 p.s.i.g. This is so despite the fact that the lower synthesis pressure will cause an increase in the necessary power for the refrigerant compression. It therefore becomes possible to operate the ammonia process substantially independently of an external source of power, i.e., all or nearly all of the power required for process prime movers is derived from the steam generated from waste heat within the process. This result is accomplished without resorting to combustion of substantial quantities of fuel over and above the fuel required to maintain the primary reforming zone at specified conditions. Where the process is not entirely independent of an external source of power, the necessary increment of power can be provided, for example, by use of a small fired boiler to augment high-pressure steam generation.

The ammonia synthesis is preferably carried out by reacting a combined stream of fresh and recycle synthesis gas at pressures ranging from about 1500 p.s.i.g. to about 3500 p.s.i.g. over any one of the well known iron synthesis catalysts. Temperatures within the conversion zone are maintained between about 500° F. and about 1000° F, preferably between about 700° F. and about 950° F. Due to the exothermic nature of the reaction, it is advantageous to regulate the temperature of the catalyst bed by introducing relatively cool synthesis gas at various points throughout said bed. Generally about 1.5 to about 2.5 cubic feet of synthesis catalyst are provided per daily ton of ammonia produced by the process, depending upon specific synthesis pressure. Under the indicated conditions about 20 percent of the synthesis gas is converted per pass to ammonia. This degree of conversion is somewhat lower than can be obtained at synthesis pressures of about 4000 to about 6000 p.s.i.g., however, the benefits derived from the reduced compression-power requirement more than overcome the adverse effect of lower conversions.

Depending upon the nature and source of the hydrocarbon fed to the primary reforming zone and due to the air fed to the secondary reforming zone, the synthesis gas can contain varying amounts of inert rare gases such as helium and argon. In addition the synthesis gas will contain some quantities of methane which also is inert in the synthesis. In order to prevent excessive accumulation of such inerts in the synthesis loop by recycling, a portion of the recycle gas is purged from the process to maintain a concentration of inerts in the combined feed to the converter between about 5 and about 20 mol percent, preferably between about 10 and about 15 mol percent.

The refrigerant used for cooling and condensing of the ammonia product is preferably liquid ammonia. The refrigeration cycle is completed by recompressing and condensing the flashed ammonia vapors. Product ammonia can advantageously be used to provide part of the required refrigeration especially if at least a portion of said product ammounia is to be withdrawn in a gaseous state.

For a better understanding of the invention, reference is had to the example and specific embodiment thereof shown in the drawings.

It will be understood that various valves, pumps, controls and related auxiliary equipment are required in practicing the process shown. In the interest of simplicity, such items have not been shown or described since the need for them, their location and their manner of use are well known to those skilled in the art.

Referring to FIGURE 1, 444.5 mols/hour of feed, consisting of a light distillate having 100.8 molecular weight and 0.704 specific gravity, is introduced in line 11, and mixed with 148.1 mols/hour of synthesis gas containing about 75 mol percent hydrogen and flowing from compressor 91 through line 12. The mixed stream in line 13 is preheated in preheater 14 to about 750° F. after which it is introduced into desulfurization zone 15 operated at 556 p.s.i.g. inlet pressure. The desulfurized effluent in line 16 is mixed with 11,110.2 mols/hour of steam from line 17, said steam having a temperature of 610° F. and a pressure of 540 p.s.i.g. The mixed stream in line 18 having a molecular weight of 77.7 and containing 18.8 mol percent hydrogen is preheated in preheater 14 to 975° F. and subsequently introduced to the tubular primary reaction zones 21, located in the primary reforming furnace 19, and containing about 635 cubic feet of a commercial reforming catalyst. The effluent stream 22, having a molecular weight of 15.22 and containing about 34.4 mol percent hydrogen, is withdrawn from the primary reforming zone at a rate of 16,168.4 mols/hour and a pressure of about 450 p.s.i.g. and a temperature of about 1579° F. and is fed to the secondary reforming zone 23. 3,331.4 mols/hour of process air in line 24 is compressed by compressor 26 and mixed in line 28 with 323.3 mols/hour of steam at 610° F. and 540 p.s.i.g. from line 27. The mixture is preheated in preheater 14 and introduced at 850° F. to secondary reformer 23, charged with about 1000 cubic feet of a commercial reforming catalyst. The effluent having a molecular weight of 16.84 and containing 31.6 mol percent of hydrogen is exiting at a rate of 20,670.3 mols/hour and at 1814° F. and 435 p.s.i.g. in line 29 and is heat exchanged in steam generators 31 and 32 with boiler feed water after which it is introduced at 700° F. and 425 p.s.i.g. into shift converter 33 having a high-temperature stage 34 and a low-temperature stage 5. Stage 34 is charged with a total of 1274 cubic feet of a commercial high-temperature shift conversion catalyst. Stage 35 is charged with 530 cubic feet of zinc oxide for residual sulfur removal and 2286 cubic feet of commercial low-temperature shift conversion catalyst. The effluent 36 from stage 34 containing about 38 mol percent of hydrogen and at a temperature of about 814° F. is cooled in steam generator 37 against boiler feed water to 650° F. and further cooled by heat exchange in exchanger 38 to 499° F. A portion of the cooled stream in line 41 is further heat exchanged in steam generator 42 with boiler feed water to generate 50 p.s.i.g. steam and reunited with the remaining portion flowing through line 39. The apportionment of the streams is such that the temperature of the reunited streams in line 43 will have a temperature of 450° F. at the inlet of stage 35. The effluent 44 from said stage, having a temperature of 487° F. and containing 39.6 mol percent of hydrogen and 0.5 mol percent of unreacted carbon monoxide, is cooled by successive heat exchange in exchanger 46 to 265° F., in exchanger 47 to 255° F. and is further cooled by water in cooler 48 to 220° F. after which it is introduced in separation drum 49 to remove 6005.8 mols/hour of condensed water in line 51. 14,664.5 mols/hour of uncondensed material is introduced via line 52 at 222° F. and 384 p.s.i.g. into absorber 53 where it is contacted with 5836 gallons per minute of a commercial regenerable $CO_2$ absorbent such as, for example, monoethanolamine solution.

The carbon dioxide-containing absorbent amounting to 5870 gallons per minute is withdrawn through line 54, reduced in pressure by means of valve 56 to about 15 p.s.i.g and introduced into stripper 57. A portion of the absorbent is withdrawn via line 58 and split up into streams 59 and 62. Absorbent in line 59 amounting to 344 gallons per minute is heated by indirect heat exchange with 39,200 lb./hour of 50 p.s.i.g. steam in reboiling exchanger 61 thereby partially vaporizing the stream. The absorbent in line 62, amounting to about 1146 gallons per minute, is heated by indirect heat exchange in reboiling exchanger 46 to partially vaporize the stream. The partially vaporized streams are joined in line 63 and reintroduced to the stripper. The carbon-dioxide containing gaseous overhead in line 64 is withdrawn at 220° F. and at a rate of 7,987.2 mols/hour and cooled to 140° F. by cooler 66 to condense water, which is separated in drum 67. The uncondensed material in line 68 amounting to 3,470.0 mols/hour may be further cooled in equipment not shown to condense additional water that may be recycled to the system together with absorbent makeup, also not shown on the drawing, necessary to maintain a constant inventory in the absorber-stripper system. 4,517.2 mols/hour of condensate is withdrawn via line 69 and reintroduced by means of pump 71 into stripper 57. Regenerated absorbent at 224° F. is withdrawn at a rate of 4,588 gallons per minute through line 72 and recycled to the absorber 53 by means of pump 73, being first cooled to 218° F. with boiler feed water to preheat the latter in heat exchanger 74. 1,248 gallons per minute of regenerated absorbent at 250° F. in line 76 is pressurized by means of pump 77, cooled to 168° F. to preheat boiler feed water in exchanger 78 and further cooled to 158° F. by means of cooler 79 prior to being introduced into absorber 53.

The gaseous effluent in line 81 from absorber 53 amounting to 11,128.3 mols/hour and containing 73.8% hydrogen is heated in exchanger 47 to 240° F. and further in exchanger 38 to 600° F. after which it is introduced at 370 p.s.i.g. into methanator 82 charged with about 840 cubic feet of commercial methanation catalyst. The effluent stream 83 exiting at a rate of 10,919.5 mols/hour and at 714° F. is first cooled to 292° F. to preheat boiler feed water in exchanger 84 and then to 87° F. with cooling water in cooler 86 to condense water which is separated in drum 87 and withdrawn through line 88. The uncondensed stream in line 89 at a pressure of about 350 p.s.i.g. being the synthesis gas, is charged at a rate of 10,686.4 mols/hour to the suction end of the first stage 92 of the multistage synthesis gas compressor 91. The compressed gas from stage 92 is withdrawn through line 94 at a pressure of about 800 p.s.i.g. and a portion of said gas is fed to the desulfurization step via line 12. The remaining portion is cooled with water in cooler 96 to 87° F. and with ammonia refrigerant in cooler 97 to 46° F. to condense about 12.2 mols/hour of water which is separated in drum 98 and withdrawn through line 99. The uncondensed gas amounting to 10,283.4 mols/hour is fed in line 101 to the suction end of the last stage 93 of compressor 91. For the sake of simplicity, it has been assumed in this example that the losses which in reality are encountered at various points throughout the process, are occurring at the synthesis compressor which is the reason for the material balance to be less than 100% around said compressor. Recycle synthesis gas amounting to 43,501.0 mols/hour and emanating from the primary separator 102 and flowing through lines 103 and 104, is compressed in the last stage 93 of compressor 91, and the resulting stream of compressed gas in line 105 at 2200 p.s.i.g. and at about 92° F. is cooled by a series of cooling steps with ammonia refrigerant to a final temperature of −10° F. in heat exchange zone 106 to condense 22,353 lb./hour of ammonia, which is separated in secondary separator 107 and withdrawn through line 108. 52,466.9 mols/hour of uncondensed material containing 63.2% hydrogen flowing through line 109 is heated by indirect heat exchange in exchanger 111 to 55° F. and exchanger 112 to 300° F. after which it is injected into the ammonia converter 113. The major portion of this gas is introduced through lines 114 and 115 with a minor portion being used for quench at one or more points as by typical line 116. Reactor 113 incorporates a heat exchanger (not shown) by which inlet and exit gases are passed into indirect heat exchange with one another to preheat the inlet gas to reaction temperature. Reactor 113 contains 2153 cubic feet of commercial ammonia synthesis catalyst. The hot effluent from reactor 113 in line 123 flowing at a rate of 47,786.9 mols/hour and containing about 54.8 mol percent hydrogen is cooled in a series of steps: first with boiler feed water in exchanger 124 from 553° F. to 320° F., then with feed to synthesis reactor 113 in exchanger 112 to a temperature of about 77° F., then with ammonia refrigerant in exchanger 126 to 66° F., and again with the feed to the synthesis reactor in exchanger 111 to about 35° F. to condense 56,842 lb./hour of ammonia which is separated in primary separator 102 and withdrawn through line 127. The uncondensed material carried through line 103 at a rate of 44,435.1 mols/hour and containing about 58.9 mol percent of hydrogen is split into two streams, a recycle gas stream in line 104 to compressor 91 as aforesaid and a purge gas stream in line 128 amounting to 934.1 mols/hour. The latter is cooled by ammonia refrigerant to −10° F. in exchanger 129 to condense out about 545 lb./hour of additional ammonia. The condensate is separated in purge gas separator 131 and withdrawn through line 132, while 901.9 mols/hour of purge gas of about 61 mol percent hydrogen concentration is withdrawn from the system by conduit 133.

The ammonia condensates carried by lines 108, 127 and 132 are reduced in pressure by the respective valves 134, 136 and 137 after which the streams are combined in line 138 and subsequently introduced into drum 139 maintained at 230 p.s.i.g. and 21° F. 45.7 mols/hour of flashed vapor containing 42.9 mol percent of hydrogen resulting from the previous reduction of pressure by valves 134, 136 and 137 are fed to the purge gas separator 142 via conduit 141. The purge gas separator is cooled with ammonia refrigerant in coils 143 resulting in the cooling and condensing of 100 lb./hour of ammonia product which is returned to drum 139 via conduit 146. The purge gas amounting to 39.8 mols/hour of 42.9 mol percent hydrogen concentration is vented through line 144. Liquid ammonia product amounting to 79,228 lb./hour is carried by conduit 147 and combined with circulated ammonia refrigerant in line 152 within the conventional compression-expansion refrigeration system depicted for simplicity by block 148. A vaporous portion of the ammonia product amounting to 11,884 lb./hour, resulting from successive flashing of ammonia to a pressure of about 36 p.s.i.g. is withdrawn from the system through line 149 as one of the product streams of the process. The remaining ammonia is utilized for additional refrigeration duties after which the resulting vapors are withdrawn at various points, here depicted by the single line 150, and recompressed by compressor 151 to about 165 p.s.i.g. The recycle ammonia refrigerant is withdrawn through line 152 and 67,344 lb./hour of liquid ammonia is withdrawn from line 153, said ammonia being a product of the process.

Part of the high-pressure steam system is shown in FIGURE 1. Thus, deaerated and preheated boiler feed water at a pressure of 1500 p.s.i.g. enters through line 161 and is further preheated in preheater 14 to 515° F. and in primary reformer furnace 19 to 597° F., at which temperature the water will partially vaporize. The vapors are separated from liquid water in steam drum 162, a purge water stream is withdrawn from drum 162 through line 163 and the remaining liquid water is withdrawn through line 164. A portion of this water flowing through line 166 is further split in two portions flowing through lines 167 and 168. Steam is generated by indirect heat exchange with the effluent stream 29 from secondary reformer 23 in generators 31 and 32. The effluent streams from said generators are combined in line 169 and fed back to drum 162 via line 226 to separate the steam from any remaining liquid water.

The remaining portion of water from line 164 is fed through conduit 171 into steam generation zone 37 where the heat for the generation of steam is supplied by indirect heat exchange with the effluent 36 from the high temperature shift conversion zone 34. The effluent from the steam generation zone is fed to drum 162 via lines 172 and 226 to separate steam from unvaporized water. The system comprising drum 162, exchangers 31, 32 and 37, together with their connecting lines is designed for a high recirculation of liquid water. The liquid/vapor ratio is about 8:1. The steam fraction from drum 162 in line 173 is superheated in primary reformer furnace 19 to 825° F. after which it is fed to the synthesis gas compressor turbine to provide its power, this step not being shown in FIGURE 1. The steam system is shown in greater detail in FIGURE 2.

Referring now to FIGURE 2, 288,892 lb./hour of demineralized water enters through line 201 and is preheated from 70° F. to 115° F. by recovery of waste heat in heat exchanger 74 from regenerated absorbent. This water stream is combined in line 203 with 131,600 lb./hour of condensate in line 202 having a temperature of 115° F. The combined stream is preheated to 230° F. in exchanger 78 by indirect heat exchange with another stream of regenerated absorbent prior to being introduced into deaerator 204 maintained at 20 p.s.i.g. The deaerator 204 is simultaneously fed with 39,200 lb./hour of steam condensate in line 206 resulting from using that amount of 50 p.s.i.g. steam in heat exchanger 61 to partially supply the necessary heat for regeneration of carbon-dioxide containing absorbent and with 11,750 lb./hour of low-pressure steam from line 207. The deaerated water exiting through line 208 at a temperature of 259° F. and at a rate of 471,442 lb./hour is pressured to 1500 p.s.i.g. by means of pump 209. 9700 lb./hour of 50 p.s.i.g. steam is generated by indirect heat exchange with shift converter effluent from the high temperature zone in exchanger 42 from a portion of the water flowing in line 211 and amounting to 9800 lb./hour. The nonvaporized water is withdrawn from the 50 p.s.i.g. steam generation zone at a rate of 100 lb./hour (not shown on drawing). The remaining portion in line 212 is split into two streams in lines 213 and 214. The stream in line 213 consisting of 337,642 lb./hour is preheated by the hot ammonia synthesis reactor effluent in exchanger 124 to a temperature of 510° F. and the stream in line 214 is preheated by the methanator effluent in exchanger 84 to 510° F. The streams are recombined in line 161 (see also FIGURE 1) and heated further in preheater 14 and in primary reformer furnace 19 to 596° F. at which temperature 42,200 lb./hour of 1500 p.s.i.g. steam is formed. The combined steam-water stream is fed to steam drum 162. 4600 lb./hour of water is withdrawn as a purge stream in line 163 and depressured to 20 p.s.i.g. resulting in flashing 1500 lb./hour of steam which is fed to the deaerator 204 via line 218, constituting a portion of the steam fed thereto in line 207. The unvaporized purge water is withdrawn through line 219. The remaining 414,842 lb./hour of liquid water is withdrawn through line 164 and split into three streams in lines 168, 167 and 171 carrying respectively 296,442 lb./hour, 64,400 lb./hour and 54,000 lb./hour. 1500 p.s.i.g. steam is generated in the corresponding steam generators 31, 32 and 37 by indirect heat exchange with secondary reformer effluent in generators 31 and 32 and with high temperature shift converter effluent in generator 37. After the steam generation the streams are recombined in line 226 and fed back to steam drum 162. The net steam make, amounting to 457,042 lb./hour, is fed via line 173 to primary reformer furnace 19 for superheating to 825° F. and then to steam turbine 229 driving synthesis gas compressor 91, where the steam entering at a pressure about 1450 p.s.i.g. is expanded to a pressure of 540 p.s.i.g. The expanded steam is withdrawn through line 231 and split into two portions, one of which is fed at a rate of 5500 lb./hour to the second steam turbine 234 of synthesis gas compressor 91 where it is further expanded to a final pressure of 4 inches of mercury. The combined expansion of steam develops the 15,900 horsepower necessary for compression of the synthesis gas. The remaining portion consisting of 448,042 lb./hour of 540 p.s.i.g. steam in line 233 constitutes the intermediate pressure system as depicted by single line 268 and is split into six streams carried in lines 27, 17, 238, 239, 241 and 242 at the following respective rates: 5,820, 199,982, 48,500, 60,200, 67,000 and 66,540 lb./hour. The steam in line 27 is ultimately fed to the secondary reformer 23 as process steam, the steam in line 17 to the primary reformer 19 as process steam, while steam in line 238 is expanded to 50 p.s.i.g. in the steam turbines, indicated generally at 243, that drive boiler feed water pump 209 and the induced draft fan (not shown) of primary reformer 19. The steam in line 239 is further expanded in the steam turbine 246 driving the ammonia refrigerant compressor 151, to a pressure of 15 p.s.i.g. Steam in line 241 is further expanded in the steam turbine 247 driving air compressor 26. The steam in line 242 is further expanded to 15 p.s.i.g. in the steam turbines, indicated generally at 244, that drive circulating absorbent pumps 73 and 77, the pump (not shown) for circulating cooling water in the plant, the pump (not shown) for pressuring demineralized water through line 201 to deaerator 204, the forced draft fan (not shown) of primary reformer 19, and the auxiliary lube oil pump (not shown).

Packing leakoff from the steam turbines 229 and 234 of synthesis compressor 91 and exiting through lines 248, 249 and 251 is combined in line 252 at a rate of 4600 lb./hour. 3500 lb./hour of this steam is fed to the 50 p.s.i.g. steam system shown on the drawing as single line 269 via line 253, while the remaining 1100 lb./hour of steam is directed to the 15 p.s.i.g. steam system, depicted as single line 271, by means of conduit 254. The exhaust steam from turbines 243 having a pressure of 50 p.s.i.g. is fed to the 50 p.s.i.g. steam system via line 256. The exhaust steam from turbine 246 is condensed in cooler 257 and the condensate is pressured to 58 p.s.i.g. by means of pump 258. The exhaust steam from turbine 234 is combined with the exhaust steam from turbine 247 in line 259 and condensed by cooling in cooler 261. The condensate is pressured to 58 p.s.i.g. by means of pump 262, after which it is combined with the condensate pressured by pump 258 in line 202. The exhaust steam from turbines 244 is withdrawn by means of conduit 263 after which it is combined with the 1100 lb./hour of packing leakoff in line 254 and an additional 5150 lb./hour of steam obtained from 50 p.s.i.g. steam system by means of conduit 264, and the combined 15 p.s.i.g. steam totaling 72,790 lb./hour is exported outside the process by means of line 266. The balance of the steam having a pressure of 50 p.s.i.g. and amounting to 7100 lb./hour is fed via line 267 to miscellaneous steam consuming apparatus, such as vaporizers, ejectors, etc.

Thus, there is provided a multilevel steam system closely integrated with the ammonia process involving a very high degree of waste heat recovery from the process coupled with a very high degree of ultilization of such heat in the form of steam to meet the energy needs of the process. It becomes possible in accordance with the invention to reduce operating costs for the production of ammonia to levels very significantly lower than those for prior art processes by reason of the markedly improved thermal efficiency of the process. It will now be apparent to those skilled in the art that many specific arrangements other than that given in the example can be employed with all or many of the advantages of the invention. The scope of the invention is not therefore to be limited by the example but is defined in the accompanying claims.

What is claimed is:

1. In a process for the production of hydrogen-rich gas at an elevated pressure comprising reacting at an intermediate pressure and an elevated temperature a carbonaceous material taken from the group consisting of carbon monoxide, hydrocarbons and mixtures thereof with an oxidizing gas taken from the group consisting of steam, oxygen and mixtures thereof to produce hydrogen-rich gas at substantially said intermediate pressure and compressing said hydrogen-rich gas to said elevated pressure, the improvement which comprises generating steam at a pressure substantially greater than said intermediate pressure by indirect heat exchange between water and said hydrogen-rich gas at substantially said intermediate presssure, expanding steam thus generated and using resulting expansion energy to provide at least part of the energy required for gas compression in the process.

2. The improved process of claim 1 wherein a use to which resulting expansion energy is put is to provide at least part of the energy required for the step of compressing said hydrogen-rich gas to said elevated pressure.

3. The improved process of claim 1 wherein said steam generated at a pressure substantially greater than said intermediate pressure is expanded to approximately said intermediate pressure and at least part of the resulting steam at approximately said intermediate pressure is passed to said process to provide at least part of the oxidizing gas for reaction with additional carbonaceous material.

4. The improved process of claim 3 wherein the pressure at which the steam is generated by said indirect heat exchange is at least twice as great as said intermediate pressure.

5. The improved process of claim 3 wherein said intermediate pressure is within the range of about 350 to about 750 p.s.i.g., said elevated pressure to which said hydrogen-rich gas is compressed is in the range of about 1000 to about 5000 p.s.i.g., and the pressure at which the steam is generated by said indirect heat exchange is in the range of about 800 to about 1800 p.s.i.g.

6. The improved process of claim 3 wherein another part of said resulting steam at approximately said intermediate pressure is further expanded and at least part of the energy required for said step of compressing said hydrogen-rich gas to said elevated pressure is provided by using energy from such further expansion.

7. The improved process of claim 3 wherein another part of said resulting steam at approximately said intermediate pressure is further expanded and energy thereby produced is used to increase the pressure of said water for said indirect heat exchange to the pressure at which steam is generated in said indirect heat exchange.

8. In a process for the production of hydrogen-rich gas at an elevated pressure comprising contacting at an intermediate pressure and an elevated temperature hydrocarbons and steam in the presence of reforming catalyst to produce hydrogen-rich gas at substantially said intermediate pressure and compressing said hydrogen-rich gas to said elevated pressure, the improvement which comprises generating steam at a pressure substantially greater than said intermediate pressure by indirect heat exchange between water and said hydrogen-rich gas at substantially said intermediate pressure, expanding steam thus generated to approximately said intermediate pressure, using resulting expansion energy to provide at least part of the energy required for gas compression in the process, and passing at least part of the expanded steam to said process to provide at least part of the steam required for contacting with additional hydrocarbons.

9. The improved process of claim 8 wherein said contacting step is carried out in a tubular furnace, the elevated temperature of the contacting step is attained by burning a fuel with air in a combustion chamber of said furnace to produce hot flue gas, and the steam which is expanded is first superheated by indirect heat exchange with said hot flue gas.

10. The improved process of claim 8 wherein said contacting step is carried out in a tubular furnace, the elevated temperature of the contacting step is attained by burning a fuel with air in a combustion chamber of said furnace to produce hot flue gas, and the water for said indirect heat exchange is first preheated by indirect heat exchange with said hot flue gas.

11. The improved process of claim 8 wherein said contacting step is carried out in a tubular furnace, the elevated temperature of the contacting step is attained by burning a fuel with air in a combustion chamber of said furnace to produce hot flue gas, another part of the expanded steam is further expanded and energy thereby produced is used to drive draft fans associated with the combustion chamber of said furnace.

12. The improved process of claim 8 wherein another part of the expanded steam is further expanded and energy thereby produced is used to provide at least part of the energy required to compress said hydrocarbons to said intermediate pressure prior to said contacting step.

13. In a process for the production of hydrogen-rich gas at an elevated pressure comprising contacting at an intermediate pressure and an elevated temperature carbon monoxide and steam in the presence of shift conversion catalyst to produce hydrogen-rich gas at substantially said intermediate pressure and compressing said hydrogen-rich gas to said elevated pressure, the improvement which comprises generating steam at a pressure substantially greater than said intermediate pressure by indirect heat exchange between water and said hydrogen-rich gas at substantially said intermediate pressure, expanding steam thus generated to approximately said intermediate pressure, using resulting expansion energy to provide at least part of the energy required for gas compression in the process, and passing at least part of the expanded steam to said process to provide at least part of the steam required for contacting with additional carbon monoxide.

14. The improved process of claim 13 wherein relatively low-pressure steam is also generated by indirect heat exchange between water and said hydrogen-rich gas at substantially said intermediate pressure following the first-mentioned indirect heat exchange with said gas, and thus cooled hydrogen-rich gas at substantially said intermediate pressure is contacted in the presence of additional shift conversion catalyst to further enrich the gas with respect to hydrogen prior to said compression thereof to said elevated pressure.

15. In a process for the production of hydrogen-rich gas at an elevated pressure comprising reacting at an intermediate pressure and an elevated temperature a carbonaceous material taken from the group consisting of carbon monoxide, hydrocarbons and mixtures thereof with an oxidizing gas taken from the group consisting of steam, oxygen and mixtures thereof to produce hydrogen-rich gas containing $CO_2$ at substantially said intermediate pressure, contacting said gas with a regenerable $CO_2$ absorbent at substantially said intermediate pressure to produce hydrogen-rich gas depleted in $CO_2$ at substantially said intermediate pressure and absorbent enriched in $CO_2$, heating and depressuring said enriched absorbent to regenerate it, cooling and repressuring regenerated absorbent for reuse, and compressing said hydrogen-rich gas depleted in $CO_2$ to said elevated pressure, the improvement which comprises generating steam at a pressure substantially greater than said intermediate pressure by indirect heat exchange between water and said hydrogen-rich gas containing $CO_2$ at substantially said intermediate pressure, expanding steam thus generated to approximately said intermediate pressure, using resulting expansion energy to provide at least part of the energy required for gas compression in the process, and passing at least part of the expanded steam to said process to provide at least part of the oxidizing gas for reaction with additional carbonaceous material.

16. The improved process of claim 15 wherein the water for said indirect heat exchange is first preheated by indirect heat exchange with regenerated absorbent to carry out at least part of said cooling thereof.

17. The improved process of claim 15 wherein another part of the expanded steam is further expanded and the energy thereby produced is used to provide at least part of the energy for said repressuring of regenerated absorbent.

18. The improved process of claim 15 wherein another part of the expanded steam is further expanded to produce low-pressure steam with the production of useful energy and said low-pressure steam is used to carry out at least part of said heating of said enriched absorbent.

19. The improved process of claim 15 wherein at least part of said heating of said enriched absorbent is achieved by indirect heat exchange between said enriched absorbent and said hydrogen-rich gas containing $CO_2$ at substantially said intermediate pressure following the first-mentioned indirect heat exchange with said gas.

20. In a process for the production of hydrogen-rich gas at an elevated pressure comprising contacting at an intermediate pressure and an elevated temperature hydrocarbons and steam in the presence of reforming catalyst to produce a partially reformed gas containing unconverted hydrocarbons at substantially said intermediate pressure, contacting said partially reformed gas with steam and compressed air in the presence of reforming catalyst to produce hydrogen-rich gas at approximately said intermediate pressure and compressing said hydrogen-rich gas to said elevated pressure, the improvement which comprises generating steam at a pressure substantially greater than said intermediate pressure by indirect heat exchange between water and said hydrogen-rich gas at approximately said intermediate pressure, expanding steam thus generated to approximately said intermediate pressure, using resulting expansion energy to provide at least part of the energy required for gas compressing in the process, passing part of the expanded steam to each of the first-mentioned and second-mentioned contacting steps to provide at least part of the steam required for contacting with additional hydrocarbons.

21. The improved process of claim 20 wherein another part of the expanded steam is further expanded and energy thereby produced is used to provide at least part of the energy for compressing the air used in said process.

22. In a process for the production of ammonia comprising reacting at an intermediate pressure and an elevated temperature a carbonaceous material taken from the group consisting of carbon monoxide, hydrocarbons and mixtures thereof with an oxidizing gas taken from the group consisting of steam, oxygen and mixtures thereof to produce hydrogen-rich gas at substantially said intermediate pressure, combining nitrogen with said hydrogen-rich gas to produce ammonia synthesis gas at substantially said intermediate pressure, compressing said ammonia synthesis gas to an elevated pressure, contacting compressed ammonia synthesis gas with ammonia synthesis catalyst to produce an ammonia-containing gas at substantially said elevated pressure, and passing said ammonia-containing gas in indirect heat exchange with vaporizing refrigerant to condense ammonia, the improvement which comprises generating steam at a pressure substantially greater than said intermediate pressure by indirect heat exchange between water and said hydrogen-rich gas at substantially said intermediate pressure, expanding steam thus generated to approximately said intermediate pressure, using resulting expansion energy to provide at least part of the energy required for gas compression in the process, and passing at least part of the expanded steam to said process to provide at least part of the oxidizing gas for reaction with additional carbonaceous material.

23. The improved process of claim 22 wherein another part of the expanded steam is further expanded and energy thereby produced is used to provide at least part of the energy for recompressing refrigerant vaporized as aforesaid in said process.

24. The improved process of claim 22 wherein the water for said indirect heat exchange is first preheated by indirect heat exchange with said ammonia-containing gas before the latter is passed in said indirect heat exchange with vaporizing refrigerant.

25. In a process for the production of ammonia comprising the steps of primary reforming of hydrocarbons with steam, secondary reforming of the product gas from primary reforming with compressed air, shift conversion of the product gas from secondary reforming, removal of $CO_2$ from the product gas from shift conversion using a regenerable absorbent, methanation of the product gas from $CO_2$ removal, all of the aforesaid steps being carried out at substantially an intermediate pressure, compression of the product gas from methanation to an elevated pressure, ammonia synthesis at said elevated pressure, and ammonia recovery using a circulating refrigerant, the improvement which comprises generating steam at a pressure substantially greater than said intermediate pressure by recovery of waste heat from the product gas from secondary reforming and that from shift conversion, expanding steam thus generated to approximately said intermediate pressure, using resulting expansion energy to provide at least part of the energy required for gas compression in the process, passing part of the expanded steam to said process to provide at least part of the process steam required in said reforming and shift conversion steps, further expanding another part of the expanded steam and using the energy thereby produced to provide at least part of the remaining energy requirements of the process for gas compression and liquid pumping.

26. The improved process of claim 25 wherein the pressure at which the steam is generated by said recovery of waste heat is at least twice as great as said intermediate pressure.

27. The improved process of claim 25 wherein said intermediate pressure is within the range of about 350 to about 750 p.s.i.g., said elevated pressure to which the product gas from methanation is compressed is in the range of about 1000 to about 5000 p.s.i.g., and the pressure at which the steam is generated by said recovery of waste heat is in the range of about 800 to about 1800 p.s.i.g.

References Cited

UNITED STATES PATENTS

| | | |
|---|---|---|
| 2,465,235 | 3/1949 | Kubicek. |
| 3,088,919 | 5/1963 | Brown et al. _____ 252—373 XR |
| 3,241,933 | 3/1966 | Ploum et al. _____ 48—196 |

MORRIS O. WOLK, *Primary Examiner.*

R. E. SERWIN, *Assistant Examiner.*

U.S. Cl. X.R.

48—196, 212, 214, 215